Aug. 26, 1930. W. MEINDERSMA 1,774,206
DEVICE FOR DRIVING AND CONTROLLING FIN SHAPED PROPELLERS
Filed July 11, 1928

Inventor,
Wigger Meindersma,
By Emil Bonnelycke
Atty.

Patented Aug. 26, 1930

1,774,206

UNITED STATES PATENT OFFICE

WIGGER MEINDERSMA, OF WASSENAAR, NETHERLANDS, ASSIGNOR OF FIFTY PER CENT TO FINDRIVEN SYNDICAAT, BESTAANDE UIT DE HEEREN DR. WIGGER MEINDERSMA TE WASSENAAR VOOR, AND TWENTY-FIVE PER CENT TO DR. MEINE RUTGERS TE 'S-GRAVENHAGE EN ANTON FERDINAND JOHANNES DIJKGRAAF TE ROTTERDAM, ELK VOOR, OF THE HAGUE, NETHERLANDS, A SYNDICATE OF THE NETHERLANDS

DEVICE FOR DRIVING AND CONTROLLING FIN-SHAPED PROPELLERS

Application filed July 11, 1928, Serial No. 291,934, and in Switzerland August 1, 1927.

The present invention relates to a device for driving and controlling a fin-shaped propeller in which the driving means cause the shaft or axis of the propeller to describe an imaginary conical or other closed surface, and the controlling means cause the propeller to make half a revolution around its axis during the period in which the said closed surface is described once by the propeller shaft.

According to the invention, the controlling action is effected by means of two toothed wheels or the like which are in direct engagement, having the same direction of rotation, one of them being connected with the propeller and the other being connected with a steering shaft, the first wheel having twice as many teeth as the second one; these two wheels constituting the entire coupling between the steering shaft and the propeller if desired.

Various embodiments of the invention are illustrated in the accompanying drawings, wherein.

Figure 1:
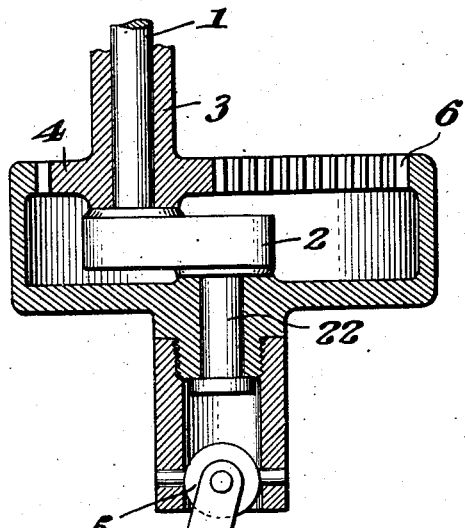
Figure 1 is a section, partly in side view, of one of the embodiments.

In the embodiment according to Fig. 1, 1 is the driving shaft over which the steering shaft 3 fits and which is provided with a crank 2 having a crank pin 22 formed with it. On the steering shaft 3 a gear 4 with external straight or spur teeth is mounted, which gear meshes with the internal teeth (likewise straight) of an annular or skeleton gear or wheel 6, which is rotatably mounted on the pin 22. The number of teeth of the gear 6 is twice that of the gear 4. The propeller shaft 7 is flexibly connected at 5 with the gearing and is supported universally rotatably in a bearing in the ship's hull by means of a ball-shaped part 16.

If the driving shaft is driven and the steering shaft 3 is kept stationary, the propeller shaft 7 (or, more precisely speaking, its centre line or axis) describes an imaginary conical surface; and during the period in which the propeller shaft describes one complete conical surface, it also makes half a revolution around its axis. If the steering shaft 3 is rotated, the position of the propeller will be changed, resulting in a change in the direction of propulsion, so that the ship may be steered in this way; the direction of propulsion being variable through the full 360°.

Figure 2:
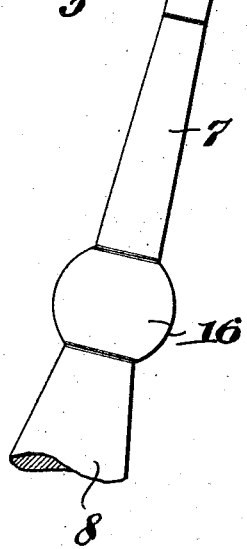
Fig. 2 shows a modification of Fig. 1 in which the steering shaft is arranged inside the driving shaft.
Figure 2:
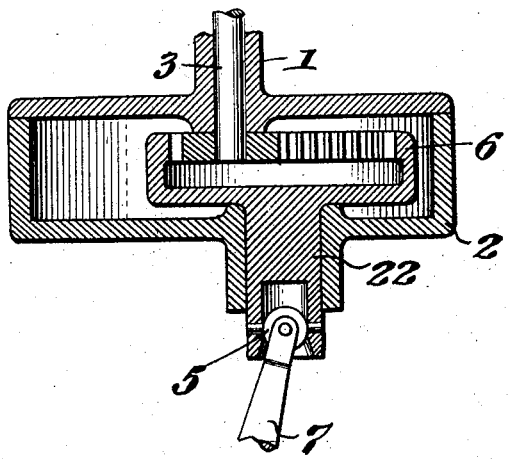

It is, of course, also possible to arrange the steering shaft 3 within the driving shaft 1, instead of on the outside thereof, Fig. 2 showing an embodiment of this.

From the foregoing it will be obvious that the invention is not limited to the driving of a fin-shaped propeller, of which the centre line or axis describes a conical surface, nor to the precise structural details illustrated.

I claim as my invention:—

Mechanism for driving and steering a fin-shaped propeller, comprising a rotating propeller shaft mounted to describe an imaginary closed surface during its rotation, driving means and steering means therefor, and controlling connections between the steering means and the propeller shaft for causing the latter to make a half-revolution about its axis during the time it describes one such closed surface; said connections embodying an internally-toothed spur wheel connected to the propeller shaft and an externally-toothed spur wheel directly in mesh therewith and connected to the steering means, one of said connections being flexible.

In testimony whereof I affix my signature.

WIGGER MEINDERSMA.

CERTIFICATE OF CORRECTION.

Patent No. 1,774,206.  Granted August 26, 1930, to

WIGGER MEINDERSMA.

It is hereby certified that the above numbered patent was erroneously issued "50 per cent to Findriven Syndicaat, Bestaande uit de heeren Dr. Wigger Meindersma te Wassenaar Voor, and 25 per cent to Dr. Meine Rutgers te 's-Gravenhage en Anton Ferdinand Johannes Dijkgraaf te Rotterdam, elk voor, of The Hague, Netherlands, a syndicate of The Netherlands", whereas said patent should have been issued to Findriven Syndicaat, Bestaande uit de heeren Dr. Wigger Meindersma te Wassenaar voor 50 per cent, and Dr. Meine Rutgers te 's-Gravenhage en Anton Ferdinand Johannes Dijkgraaf te Rotterdam, elk voor 25 per cent, of The Hague, Netherlands, a syndicate of The Netherlands, as shown by the records of assignments in this office; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.